United States Patent

[11] 3,610,828

[72] Inventors Alfred L. Girard
Billerica;
Andrew S. Griffiths, Auburndale; Eugene H. Sheftelman, Weston; William H. Smith, Hanover, all of Mass.
[21] Appl. No. 640,665
[22] Filed May 23, 1967
[45] Patented Oct. 5, 1971
[73] Assignee Technical Communications
Lexington, Mass.

[54] PRIVACY COMMUNICATION SYSTEM
3 Claims, 4 Drawing Figs.

[52] U.S. Cl. .......... 179/1.5 S, 325/32
[51] Int. Cl. .......... H04m 1/68, H04k 1/02
[50] Field of Search .......... 179/1.5 S

[56] References Cited
UNITED STATES PATENTS

| | | | |
|---|---|---|---|
| 3,073,892 | 1/1963 | Druz | 179/1.5 |
| 3,098,936 | 7/1967 | Isabeau | 179/1.5 |
| 3,069,657 | 12/1962 | Green et al. | 179/1.5 UX |
| 3,180,927 | 4/1965 | Heppe et al. | 179/1.5 UX |
| 2,905,747 | 9/1959 | Kidd et al. | 179/1.5 X |
| 2,999,900 | 9/1961 | DeVries et al. | 179/1.5 |
| 3,123,672 | 3/1964 | Ross | 179/1.5 |

*Primary Examiner*—Rodney D. Bennett, Jr.
*Assistant Examiner*—Daniel C. Kaufman
*Attorney*—Cesari and McKenna

ABSTRACT: A privacy arrangement for a communication system scrambles the analog (audio) input signals prior to transmission by modifying successive fragments thereof in accordance with a complex code word. At the receiving end the signal is reconstituted by once again modifying it, this time in accordance with a locally generated code word identical with the word used at the transmitting end.

INVENTORS.
ALFRED L. GIRARD
ANDREW S. GRIFFITHS
EUGENE H. SHEFTELMAN
WILLIAM H. SMITH
BY
Blair, Buckles, Cesari & St. Onge
ATTORNEYS INVENTORS
ALFRED L. GIRARD
ANDREW S. GRIFFITHS
EUGENE H. SHEFTELMAN
WILLIAM H. SMITH
BY
Blair Buckles Cesari & St. Onge
ATTORNEYS INVENTORS.
ALFRED L. GIRARD
ANDREW S. GRIFFITHS
EUGENE H. SHEFTELMAN
WILLIAM H. SMITH
BY Blair, Buckles, Cesari & St. Onge
ATTORNEYS

PRIVACY COMMUNICATION SYSTEM

BACKGROUND OF THE INVENTION

1. Field of the Invention

Our invention relates to a private communication system. More particularly, it relates to an improved privacy device for scrambling signals to be transmitted over radio or telephone circuits and then unscrambling the signals at the receiving end of the communication link.

A privacy device is particularly useful when it is desirable to render unintelligible radio or telephone transmissions that are subject to interception by unauthorized parties. Thus, it can be used to ensure the privacy of voice transmissions made by police, various government agencies or the military. It is similarly applicable to private conversations over wireless channels, such as those provided in the Citizens' Band or allocated for telephone company usage.

2. Prior Art

Prior privacy devices have usually used one of two basic techniques as a means of making transmissions private, i.e. unintelligible to others than the intended recipient. The first technique involves the translation or shifting of portions of signal spectrum in time, frequency, or both. In the receiver they are then retranslated back to their correct places to reconstitute the original waveform. Systems of this type are relatively inexpensive, but they are also characterized by a low degree of security. That is, it is relatively easy for an unauthorized listener to unscramble the transmitted signal.

The second prior technique involves the sampling, or "-digitizing" of the information-bearing waveform into a succession of discrete values which can be imposed on the wireless or telephone carrier by digital modulation forms. These values are represented by a series of binary digits, or "bits", and the stream of bits is modulated with a pseudorandom code which changes certain of the ones to zeros, and vice versa, according to a noiselike pattern which can be reversed at the receiver. The receiver must therefore demodulate the incoming signal to provide the scrambled coded binary sequence, decode the resulting signal in accordance with the noiselike pattern, and finally convert the reconstituted digital stream back to an analog waveform. This system has the advantage of virtually unlimited security by the use of long, complex and changeable codes. However, it is relatively complicated and expensive. Moreover, it requires considerably more bandwidth than is usually available for either radio or telephone transmission. The bandwidth can be compressed, but only through the use of expensive devices.

OBJECTS OF THE INVENTION

A principal object of our invention is to provide a communication system having a higher degree of privacy than the simple scrambling arrangements used heretofore and yet costing substantially less than the more sophisticated digital arrangements.

Another object of the invention is to provide a communication system of the above type which is compatible with preexisting telephone and wireless systems and can be implemented by modifying equipment already in use without substantially altering the operation of such equipment. A more specific object is to provide a communication system for the transmission of voice signals which can be implemented by modifying only the audio sections of existing transmitting and receiving equipment.

Another object of the invention is to provide a communication system of the above type in which one can readily vary the code according to which information is modified.

Other objects of the invention will in part be obvious and will in part appear hereinafter.

The invention accordingly comprises the several steps and the relation of one or more of each steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE INVENTION

In brief, our invention provides privacy of communication by modifying successive fragments of an analog (e.g. voice) input signal with successive portions of a complex, preferably pseudorandom, code "word". The resulting signal can be transmitted directly by wire or can be used to modulate a wired or wireless carrier in accordance with conventional techniques.

At the receiving end the incoming signal is modified in reverse fashion by a replica of the code word used at the transmitter. This unscrambles or reconstitutes the signal essentially to its original form. If the signal is intercepted in the link between the transmitter and the receiver without knowledge of the code word, it cannot be reconstituted except with complex equipment, and even then only after a substantial period of time. Since the code word can be readily altered at relatively short intervals, interception and reconstitution of the signal by unauthorized persons is exceedingly difficult. Yet, as will be seen, the system is relatively simple and highly reliable.

In a typical wireless frequency modulation system, the analog signal is preferably modified by multiplying (i.e. modulating) it with the code word. For this purpose a very simple form of multiplication is phase modulation. With the code word expressed as a series of binary digits or bits, a phase modulator responsive to the code word imparts to each fragment of the signal one of two possible phase shifts, depending on whether the corresponding bit of the code word is a zero or a one. In the preferred circuit arrangement these phase shifts are 0°and 180°, and thus the phase modulator is simply a polarity-reversing switch.

DESCRIPTION OF THE DRAWINGS

For a fuller understanding of the nature and objects of the invention, reference should be had to the following detailed description taken in connection with the accompanying drawings, in which:

FIG. 1 illustrates a system incorporating the preferred arrangement. A transmitting station 10 includes a signal source 12 which, in the ordinary case, is a microphone. The output of the source 12 is passed through conditioning circuits 14 which may amplify it and filter it before passing it on to a polarity-reversing switch 16 responsive to the output of a code generator 18. The generator 18 emits a series of binary signals in synchronism with the output of a clock 20.

Figure 1:
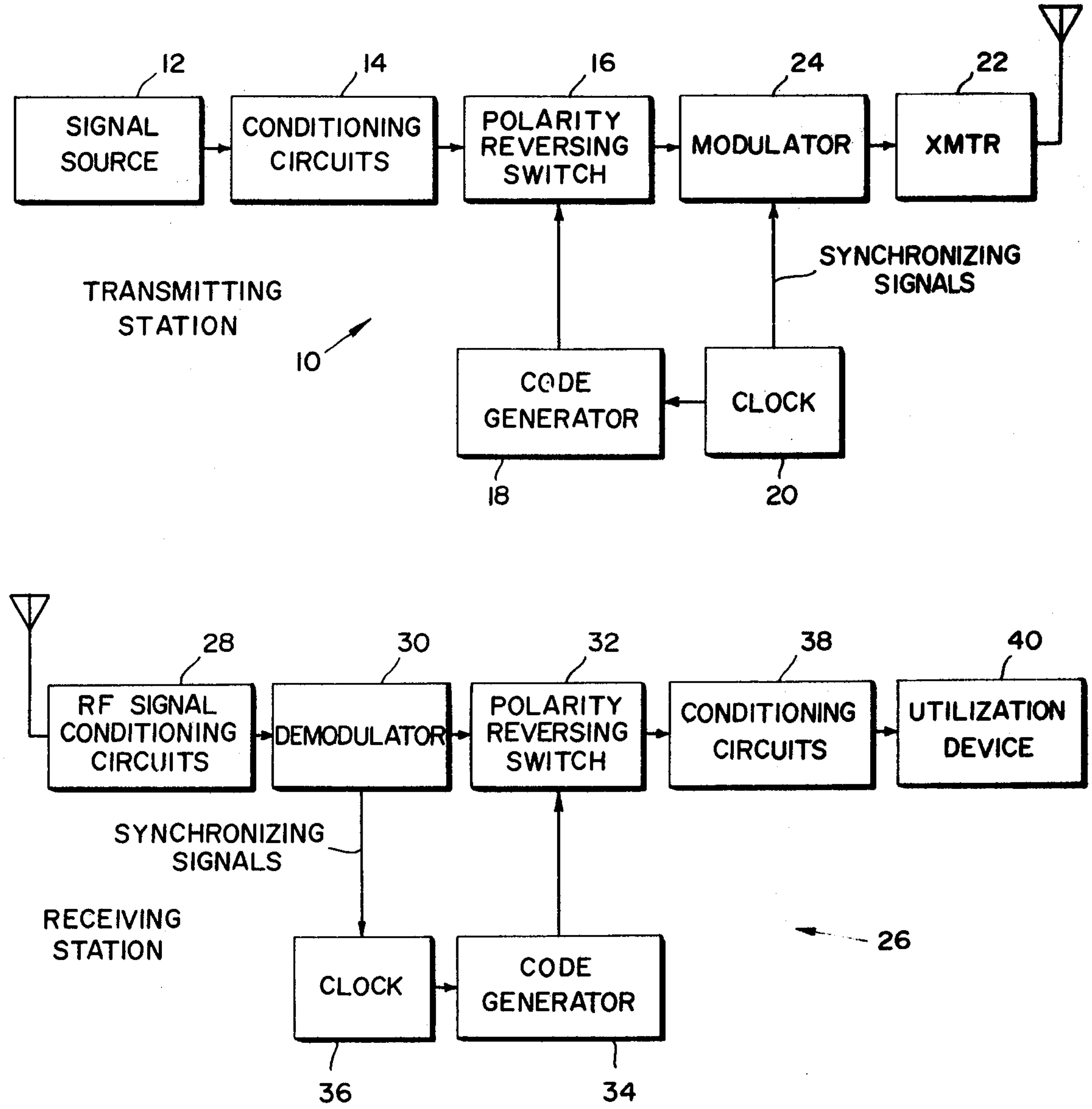
FIG. 1 is a schematic diagram of a communication system embodying the invention.

A modulator 24 modulates the output of the transmitter 22 with the audio signal scrambled by the switch 16. The output of the transmitter also includes synchronizing signals from the clock 20.

At the receiving station 26 the incoming wireless signal is passed through signal conditioning circuits 28 that amplify and filter it. It is then fed to a demodulator 30 whose output is the same as the scrambled output of the polarity reversing switch 16 at the transmitting station 10. This signal is passed through a polarity-reversing switch 32 controlled by a code generator 34 that generates the same code word as the generator 18. The generator 34 operates in accordance with the output of a clock 36 that is synchronized by the demodulated synchronizing signals from the demodulator 30. The code generator 34 therefore operates in step with the generator 18.

Accordingly, the generator 34 causes the polarity-reversing switch 32 to reverse the phase of fragments of the incoming scrambled signals in the same order as the phase reversals in the switch 16. Consequently, all of the successive fragments in the output of the switch 32 are in phase and the switch output is therefore the unscrambled or reconstituted signal generated by the signal source 12. This signal is passed through further conditioning circuits 38 and on to a utilization device 40 which, in the case of a voice communication system, may be simply a loudspeaker.

Figure 2:
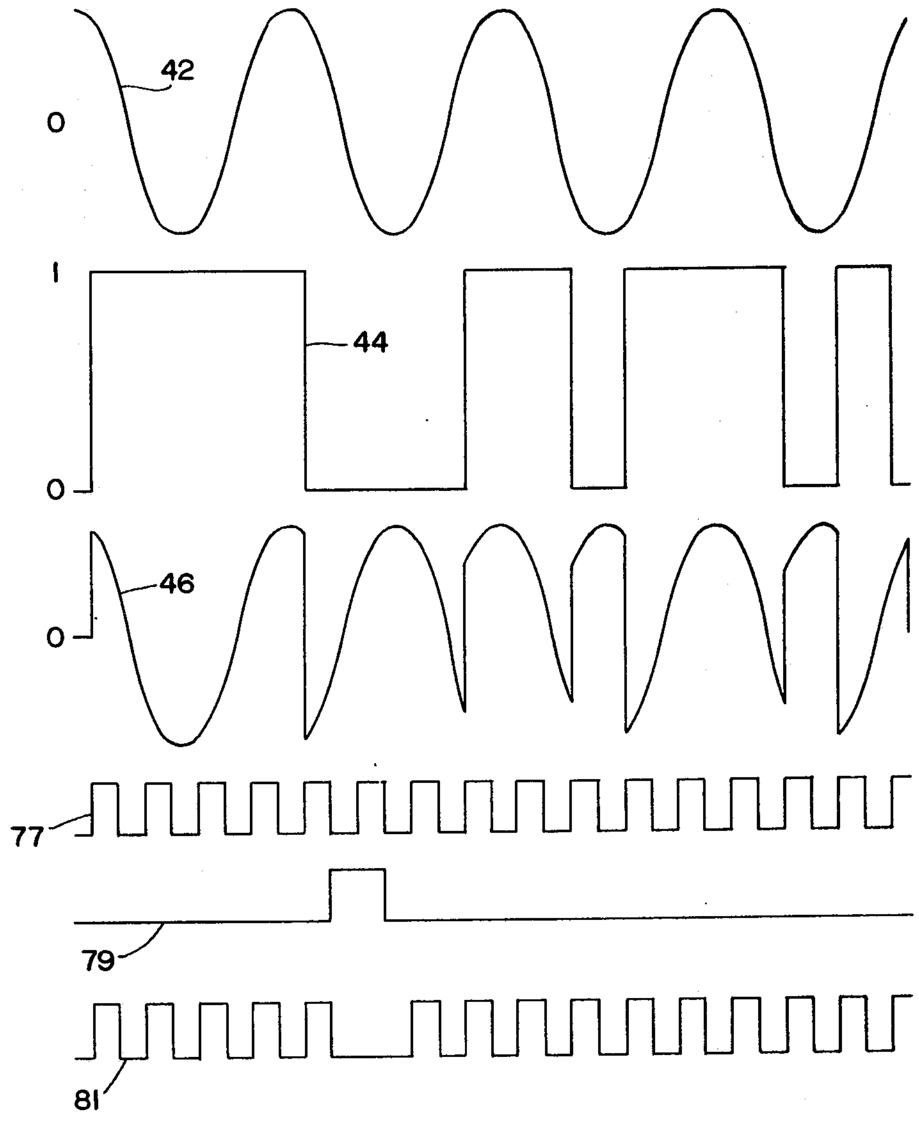
FIG. 2 depicts certain waveforms in the system.

FIG. 2 illustrates graphically the manner in which signals are scrambled and unscrambled by the system of FIG. 1. For convenience we have illustrated operation on a monotone signal; ordinarily, the signal will have a large number of frequency components. The waveform of the signal from the source 12 is illustrated at 42. The output of the code generator 18 is shown at 44. Whenever the digital output of the generator 18 is a zero, the polarity-reversing switch 16 reverses the polarity of the input signal, and whenever the generator output is a one, the switch 16 leaves the polarity unchanged. The result is the scrambled waveform 46 which, when received without unscrambling, is completely unintelligible. That is, the monotone represented by the waveform 42 is unrecognizable as such.

At the receiving station 26 the code generator 34, which is synchronized to the transmitting station generator 18, also has the wave form 44. The polarity-reversing switch 32 is arranged to reverse the polarity of the incoming waveform 46 whenever the output of the generator 34 is a zero (or a one) and leave the polarity unchanged when the generator output is a one (or a zero). This unscrambles the signal, i.e. reconstitutes it as the waveform 42.

Figure 3:
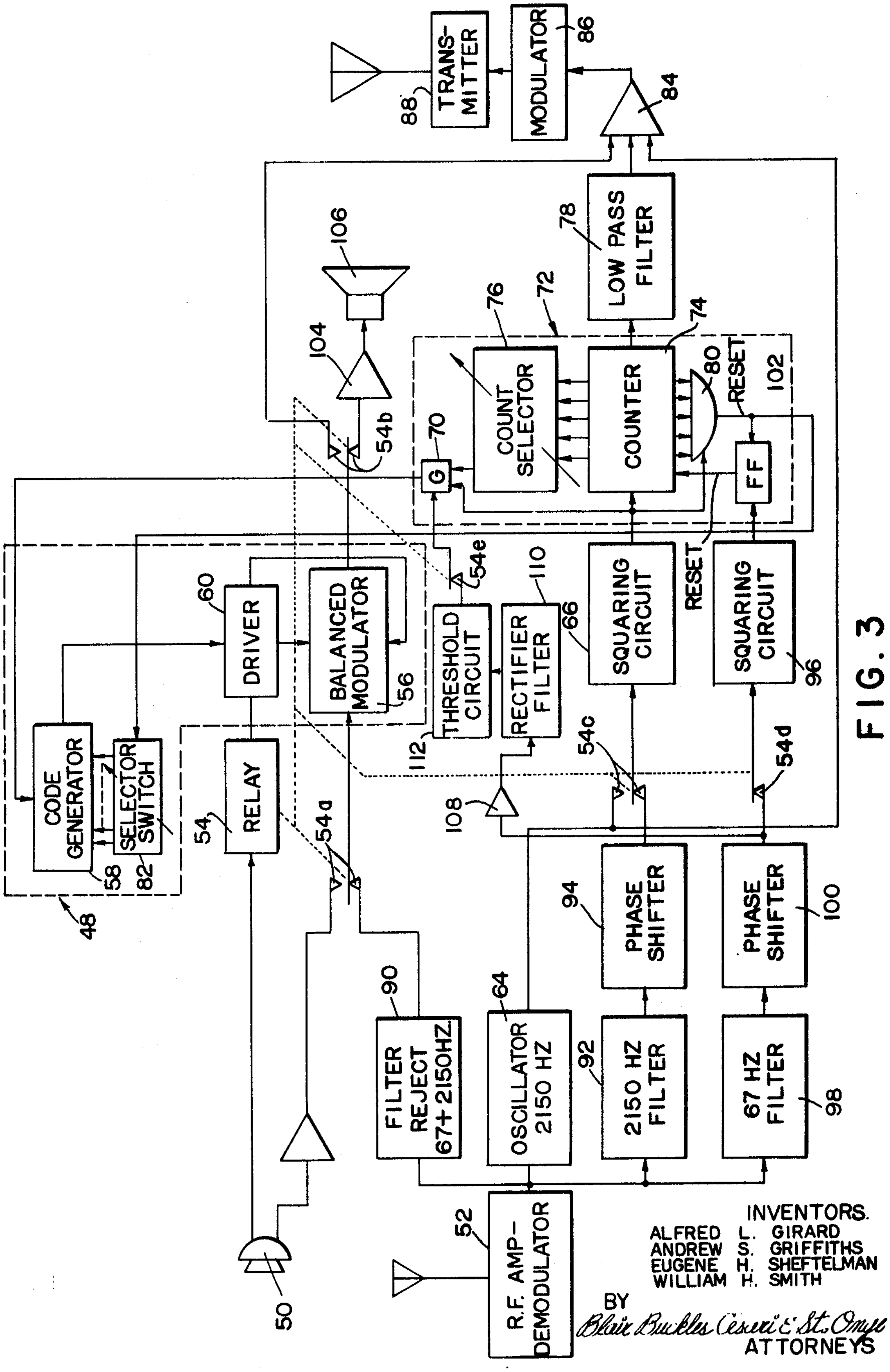
FIG. 3 is a schematic diagram of a transceiver embodying the invention.

Our invention is most efficiently instrumented by sharing certain functions common to both the transmit (code) and receive (decode) modes. This will be effective in most applications because voice systems are usually "half-duplex", employing transceivers controlled by push-to-talk buttons which govern whether the entire unit will be transmitting or receiving. Such a configuration is illustrated in FIG. 3. It is entirely feasible, however, to separate the coder and decoder and to use them simultaneously if the communication channel and users will accommodate such a full-duplex arrangement.

The transceiver about to be described in detail accommodates an audio band ranging up to 3000 Hz. Coding and decoding take place at a rate of 2150 bits per second. The code word is 32 bits long and thus is repeated at a rate of 67 Hz.

As shown in Fig. 3, the transceiver includes an encoder 48 receiving its audio input from either a microphone 50 or an RF amplifier-demodulator 52 by way of a contact set **54*a* on a transmit-receive relay 54. The relay 54 is activated by a push-to-talk switch on the microphone 50. The unprocessed audio signal from the relay 54 is multiplied by the code in a balanced modulator 56 which is driven by the output of a code generator 58 through a driver 60**.

In its preferred form the code generator 58 is a shift register in which the content of the last stage controls the balanced modulator 56. The shift register is provided with internal feedback connections in accordance with conventional techniques to provide a series of pseudorandomly arranged output bits in response to periodic clock pulses. When the relay 54 is in the transmit position, the clock pulses are provided by an oscillator 64. The output of the oscillator is passed through a relay contact set **54*c* to a squaring circuit 66 that transforms the incoming sinusoidal wave to a square wave. This is conveniently accomplished by means of high-gain, transistor differential amplifiers, which saturate and cut off to provide the flat tops of the desired waveform. The output of the squaring circuit is passed through a normally-enabled gate 70 to provide the clock pulses for the generator 58**.

The transceiver also includes a code selector 72, which will now be described in detail. The clock pulses from the squaring circuit 66 are counted by a counter 74, which has a capacity equal to the number of bits in the code word used in encoding the audio signal, i.e. 32 bits in the example described herein. The content of the counter is applied to a count selector 76 and the output of the count selector 76 is used to inhibit the gate 70.

More specifically, the count selector is a coincidence circuit which provides an inhibiting input for the gate 70 each time the counter 74 reaches a particular clock pulse count. The selector contains a suitable switching arrangement so that it emits its output signal for any selected one of the 32 counts of the counter 74. Thus, whenever the counter 74 reaches the selected count, the next clock pulse applied to the gate 70 is prevented by the gate from reaching the code generator 58. Accordingly, the output of the generator immediately prior to that clock pulse persists for one additional clock pulse period.

This has the effect of inserting an additional bit into the code word and the position in the word at which the bit is inserted is selectable by means of the count selector 76. The code generator 58 in the present example is a 31-bit generator. That is, its output is repeated after every 31 clock pulses from the gate 70. The additional bit inserted by inhibiting the gate thus results in a total code word length of 32 bits, i.e. the code generator output is repeated every 32 clock pulses.

The square clock pulse wave form is shown at 77 in FIG. 2. As indicated, the code generator shifts in response to the leading or positive-going edges of the clock pulses. Preferably, the counter 74 then responds to the negative-going portions of the pulses to prevent "contact race" or "slicing" problems. With this arrangement the outputs of the count selector 76 and gate 70 have the forms shown at 79 and 81, respectively, in FIG. 2.

Another mode of code variation results from a further function of the counter 74. It provides a synchronizing signal that is transmitted to the receiving station so that the code words generated at the latter station will be in step with the code words generated by the generator 58. That is, in order to unscramble the coded signal at the receiver, each bit of the code word must be applied to the same portion of the incoming signal as the corresponding bit in the code word that was used to scramble the signal at the transmitting end. Thus, by changing the timing of the code word with respect to the synchronizing signal one can, in effect, change the code word itself since the receiving station must use the same time relationship in order to unscramble the incoming signal.

Accordingly, the output of the last stage of the counter 74, whose condition cyclically changes at the code word rate, is passed through a low pass filter 78 to provide the word synchronizing signal. Additionally, the counter 74 is connected to a coincidence circuit 80 that is conditioned by the cleared state of the counter to pass a clock pulse from the squaring circuit 66 for the purpose of resetting the code generator 58. This pulse is applied to various stages of the code generator 58 according to the position of a timing selector switch 82, thereby setting into the generator one of the 31 numbers through which the generator cycles during the generation of each code word. Since the number in the code generator 58 at the time the counter 74 is cleared is thus varied by means of the switch 82, the timing of the code word with respect to clearing of the counter is therefore also varied in this manner.

It will be noted that each reset pulse from the coincidence circuit 80 coincides with a clock pulse passed by the gate 70 to shift the shift register incorporated in the code generator 58. The reset pulse, however, has an overriding effect. In the first place, the effect of the shift pulses is delayed somewhat, i.e. the generator 58 does not immediately shift in response to a positive-going edge of a clock pulse. The reset pulses, on the other hand, are applied to the generator in such fashion that their effect is immediate, and, furthermore, they are applied through DC connections so as to maintain the desired state of the generator for a period of time substantially in excess of the time during which a shift pulse can have an effect on the generator.

In any case, each reset pulse ordinarily imposes on the code generator 58 the same state that it would acquire as a result of receipt of the shift pulse that is overridden by the reset pulse. This follows from the fact that the length of each code word equals the capacity of the counter 74, so that each time the counter recycles to its cleared condition, the code generator recycles to the very same condition imposed on it by means of the reset pulse and the selector switch 82.

In the illustrated system, therefore, with the code selector 72 capable of 32 positions, corresponding to 16 code changes, and the selector switch 82 providing 31 changes, these switches together provide almost 500 different codes for scrambling the outgoing voice signal. With the preferred pseudorandom nature of the code word, all of these variations have an essentially orthogonal relationship and, therefore, even if the receiver has a code generator identical with the generator 58, it will be unable to unscramble the incoming signal unless it provides exactly the same relationships as are provided by the settings of the code selector 72 and selector switch 82. More specifically, even if someone obtains unauthorized access to a receiver used in the system, he will be unable to intercept messages without first cycling the various switches through a number of code variations until he hits the right combination of switch positions. This will ordinarily take a considerable length of time, and by prearrangement, these switches can be shifted periodically among a succession of predetermined settings so as to make it highly impractical for the potential unauthorized listener to gain access to communications.

Additional code variation may be obtained by changing the feedback connections in the shift register employed as the code generator 58. This changes the order in which the various states of the generator occur and accordingly alters the code word by changing the order of the various zeros and ones applied to the balanced modulator 56. Four word variations can be obtained in this manner if one restricts the system to pseudorandom code words. Accordingly, with the addition of a switch suitably connected into the feedback network in the code generator, one can increase to 2000 the total number of codes available by means of a simple switching arrangement.

With the preferred, shift register type of code generator, the number set into the generator by means of the switch 82 must be other than zero in order to generate the code word. If a zero is set into each stage of the generator, the output of the last stage will never change state in response to the shift pulses from the gate 70. Thus, by providing a corresponding position on the selector switch 82, one may prevent the scrambling of the voice signals in the balanced modulator 56 and thereby communicate with stations that are not adapted to encode and decode in correspondence with the encoder 48.

The output of the encoder 48 is passed through a relay contact set **54*b* to a summing amplifier 84 and on to a modulator 86 that modulates a transmitter 88. Other inputs to the summing amplifier 84 are the word synchronizing signal from the filter 78 and the output of the oscillator 64, which serves as a bit synchronizing signal. It should be noted that while the synchronizing signals both fall within the pass band of the system, their amplitude is much greater than any audio components at the same frequencies, and therefore the phases at these frequencies are essentially determined by the phases of the outputs of the filter 78 and oscillator 64**.

When the push-to-talk button on the microphone 50 is released to provide for reception of incoming signals, the relay 54 is thereby deenergized. Accordingly, the contact set **54*a* connects the encoder 48 to receive its signal input from the RF amplifier-demodulator 52 by way of a notch filter 90. This filter rejects the bit and code word synchronizing signals inserted at the transmitting station. The input to the squaring circuit 66 is now derived from the RF input signal by way of a filter 92, a phase shifter 94 and the relay contact set 54*c*. The phase shifter 94 is adjusted to provide the same phase relationship between the output of the squaring circuit 66 and the signal input to the encoder 48 as provided by the corresponding elements at the transmitting station. The shifting of the code generator 58** thus has the same time relationship to the signal as the shifting of the corresponding code generator used in encoding the signal.

All that remains is the proper timing of the code word with respect to the signal. This is provided by a squaring circuit 96 whose input is derived from the RF input signal by means of a filter 98 tuned to the code word rate, a phase shifter 100 and a relay contact set **54*d*. The phase shifter 100 is adjusted so that the output of the squaring circuit 96 has the same relative timing as the output of the last stage of the counter 74 at the transmitting station. Thus, using the audio signal as a time reference, at the same time the counter at the transmitter shifts to its cleared state, the output of the squaring circuit 96 at the receiving end sets a flip-flop 102 whole output immediately clears the counter 74**, i.e. imposes the zero condition on the latter.

The coincidence circuit 80 is thereby conditioned to pass the next clock pulse to reset the generator 58 and thus cause the code word at the receiving end of the communication link to recycle at exactly the same time in relation to the audio signal as the code generator at the transmitting end. Thus, assuming that the count selector 76 and selector switch 82 are set to the same positions as the corresponding elements at the transmitting station, the encoder 48 will decode the incoming signal in the balanced modulator 56 in the manner described above. The unscrambled output of the encoder 48 is passed through the contact set **54*b* to an audio amplifier 104 and loudspeaker 106**.

The reset pulse from the coincidence circuit 80 resets the flip-flop 102, thereby permitting the counter 74 to count in normal fashion after it has been reset.

The system may also be provided with a circuit for automatically disabling the encoder 48 when an unscrambled signal is received. Without performing any adjustments the operator will then receive an intelligible output from the loudspeaker 106, whether the signal has been scrambled at a compatible transmitting station or has not been scrambled at all. This is accomplished by preventing the modulator 56 from operating on the incoming signal when one or both of the synchronizing signals is absent. Generally, the presence or absence of the word synchronizing signal, which is outside the range of voice frequencies, can be used alone as indication of whether or not the incoming signal should be decoded by the encoder 48.

Accordingly, the transceiver of FIG. 3 includes an amplifier 108 connected to receive the signal from the phase shifter 100. The output of the amplifier 108 is applied to a rectifier-filter 110 whose output is a direct voltage representing the average amplitude of the input to the amplifier. A threshold circuit 112 provides an output that disables the gate 70 whenever the signal from the rectifier 110 is below a level corresponding to the receipt of a synchronizing signal from the phase shifter 100.

This prevents the application of clock pulses to the code generator 58. Accordingly, the balanced modulator 56 is no longer activated and the incoming signal passes through the modulator without being subjected to changes in polarity. Thus the decoder 48 is effectively inhibited. The inhibiting signal from the threshold circuit can be used in other ways to accomplish the same function. For example, it might be applied to the selector switch 82 to impose a constant condition on the code generator 58. Or it might actuate a relay causing the incoming signal to bypass the modulator 56 altogether.

A contact set **54*e*** on the transmit-receive relay permits the decoder inhibiting circuit to operate only when the transceiver is in the receive mode of operation.

Ordinarily, the bit rate of the code word will be of the same order of magnitude as the upper frequency limit of the information pass band. Thus, in the example given herein, where the system is to pass audio signals in the 200 Hz. to 3000 Hz. range a bit rate of 2150 Hz. was found suitable. Multiplying of the signal by the code word results in frequency components at the sum of the signal and bit frequencies, and most of these components should be passed by the system. Therefore, it is desirable to keep the bit rate as low as practicable. On the other hand, there are two lower limits on the bit rate. In the first place, if it is too low, the received signal will be intelligible even without unscrambling.

Moreover, as the bit rate is decreased, the word rate goes down correspondingly, and the frequency of the word synchronizing signal may be below the pass band of the system. This latter problem can be avoided by decreasing the word length, but then again, the masking of the signal by scrambling is correspondingly lessened. We have found that the foregoing parameter values provide effective scrambling of the signals in preexisting equipment modified to operate in accordance with the invention. At the same time, the quality of reproduction of the signals is not unduly lessened.

It should be noted that in a full-duplex system, where transmissions can be carried out in both directions at the same time, the synchronizing circuits can be simplified by providing for generation of all synchronizing signals at one end of the communication link. Thus, at that end of the link, the output of the oscillator 64 and counter 74 would time the simultaneous operation of an encoder 48 and a similar decoder. At the other end of the communication link, synchronizing signals for both the coder and decoder would then be derived from a single set of circuit elements similar to those used in the receiving mode of the circuit of FIG. 3.

Additionally, if central station operation is contemplated, with a number of outlying stations communicating with each other through the central station, the central station can serve as a common source for the synchronizing signals.

While the code word used in scrambling the signal preferably has a pseudorandom, i.e. noiselike, characteristic, this is not indispensable for a reasonable degree of privacy. Ordinarily, one can operate satisfactorily with a sufficiently complex code, even though it does not meet the mathematical definition of pseudorandom. The main criterion is that the code have a low degree of regularity. As noted above, the length of the code word is also involved. If the word is shortened, it must have a greater degree of randomness to provide the same degree of difficulty of unauthorized decoding.

The preferred arrangement of the system, which makes use of a fairly short, continuously repeated, binary code word, coupled with 180° phase modulation, is characterized by fairly simple circuitry and relatively low cost. However, the invention also includes more complex arrangements. For example, one might use a long code "word" lasting several hours and recorded on magnetic tape. This would substantially increase the degree of privacy, although it would also increase the complexity and cost of the system, particularly with regard to synchronization of code word generation at the transmitting and receiving stations. Moreover, the code word may be in analog or higher-order-digital form, although the binary arrangement is preferred because of the advantages of 180° phase modulation. Multiplication may be accomplished by other forms of modulation, though again phase modulation is ordinarily greatly preferable.

Furthermore, multiplication is not the only form of signal modification within the purview of the invention. For example, one can use an addition process, with the encoder arranged to add a voltage to the analog signal according to the output of the code generator 58. Thus, +1 volt might be added to the signal voltage when the code generator output is a one, and −1 volt might be added when the generator output is zero. Decoding is then accomplished by reverse addition.

However, multiplication is generally the preferable mode of signal modification. When addition is used, the transmitted power is the sum of the power in the information-bearing signal and the power contained in the noiselike portion added thereto. The latter is a fairly substantial portion of the total power and therefore, assuming a constraint on total transmitted power (or voltage in a wire system), the power carrying the information may be materially decreased, with a corresponding decrease in the overall signal-to-noise ratio of the system. Multiplication, on the other hand, is a signal-translating function and therefore does not ordinarily result in a material reduction of signal-to-noise ratio. Also, it is more difficult for an outsider to determine the code when multiplication rather than addition is used.

Figure 1A:
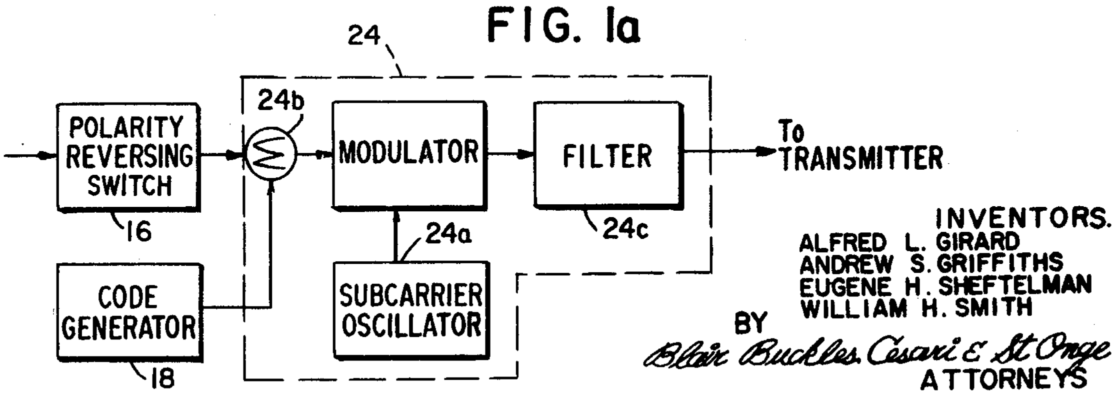

It will be apparent that numerous other modifications of the basic system described above may be made without departing from the scope of the invention. These include processing of the analog signal before or after encoding or decoding. For example, as shown in FIG. 1A, such processing may take the form of modulation of a subcarrier 24*a* with the encoded signal from switch 18 prior to transmission and after addition of the synchronizing signals in summer 24*b*. The receiving station will then incorporate corresponding demodulation from the subcarrier prior to decoding. Indeed, this arrangement may be preferred in cases where the usable audio frequency band of the system does not extend down to the word synchronizing frequency. The subcarrier may be just above the audio frequency band, e.g., 3000 Hz. in telephone circuits. The upper sideband is filtered out in filter 24*c* leaving a lower sideband in the audio band of the system, but with the frequencies inverted. The word synchronizing signal is thus translated to a frequency near the upper end of the band and is therefore readily passed through the system.

This frequency translating-inverting arrangement is useful both in wireless systems where the allowable bandwidth of audio frequency sections poses the above problem, and in wired systems where the bandwidth limitation is imposed by the transmission medium. In the latter case the "subcarrier" may actually be a carrier. In either case, the inputs and outputs of the encoder and decoder are analog signals, as opposed to prior systems incorporating digitizing techniques.

From the foregoing, it will be understood that "transmission" and "transmitting" as used herein refer to the propagation of the signal from the sender's end of the communication link, whether this be by a wireless or wire mode of propagation, and whether or not carriers within or above the audio frequency range are used.

Thus, we have described a communication system characterized by the direct encoding of analog signals and thereby providing a high degree of privacy against unwanted interception of signals. This feature is obtained at relatively low cost, i.e. without the employment of unduly complex circuitry. Moreover, preexisting equipment is readily modified to operate in accordance with the invention, essentially by inserting at one end of the audio section of the equipment a module containing the encoder-decoder and synchronizing elements described above. A further feature of the invention is the ease with which one may obtain a large number of variations of the code word used in scrambling and unscrambling the signal.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. Communications apparatus comprising

A. a code generator generating a continuously repeated cyclic code word comprising a complex series of digital signals, B. a clock providing timing pulses, said code generator providing a digit signal in response to each clock pulse, C. a counter arranged to count said clock pulses and prevent the transmission of a clock pulse to said generator whenever said counter contains a first predetermined count, D. means for setting said code generator to a predetermined point in said code word in response to a second predetermined count in said counter, E. an analog signal source, F. a phase modulator connected to phase modulate the analog signal from said source in response to the output of said code generator.

2. The combination defined in claim 1 including means for changing said first determined count and said predetermined point in said code word.

3. The combination defined in claim 1 including

A. an oscillator providing a signal at the frequency of said clock pulses,

B. means for receiving from a remote source a first synchronizing signal having the frequency of said clock pulses, C. means responsive to the content of said counter for resetting said counter to a first predetermined count in response to a second predetermined count therein, D. means for receiving a second synchronizing signal at the frequency of generation of said words by said code generator, E. switching means alternatively providing for 1. generation of said clock pulses in response to the signal from said oscillator and resetting of said counter in response to said predetermined count, or
2. generation of said clock pulses in response to said first synchronizing signal and resetting of said counter in response to said second synchronizing signal.